UNITED STATES PATENT OFFICE.

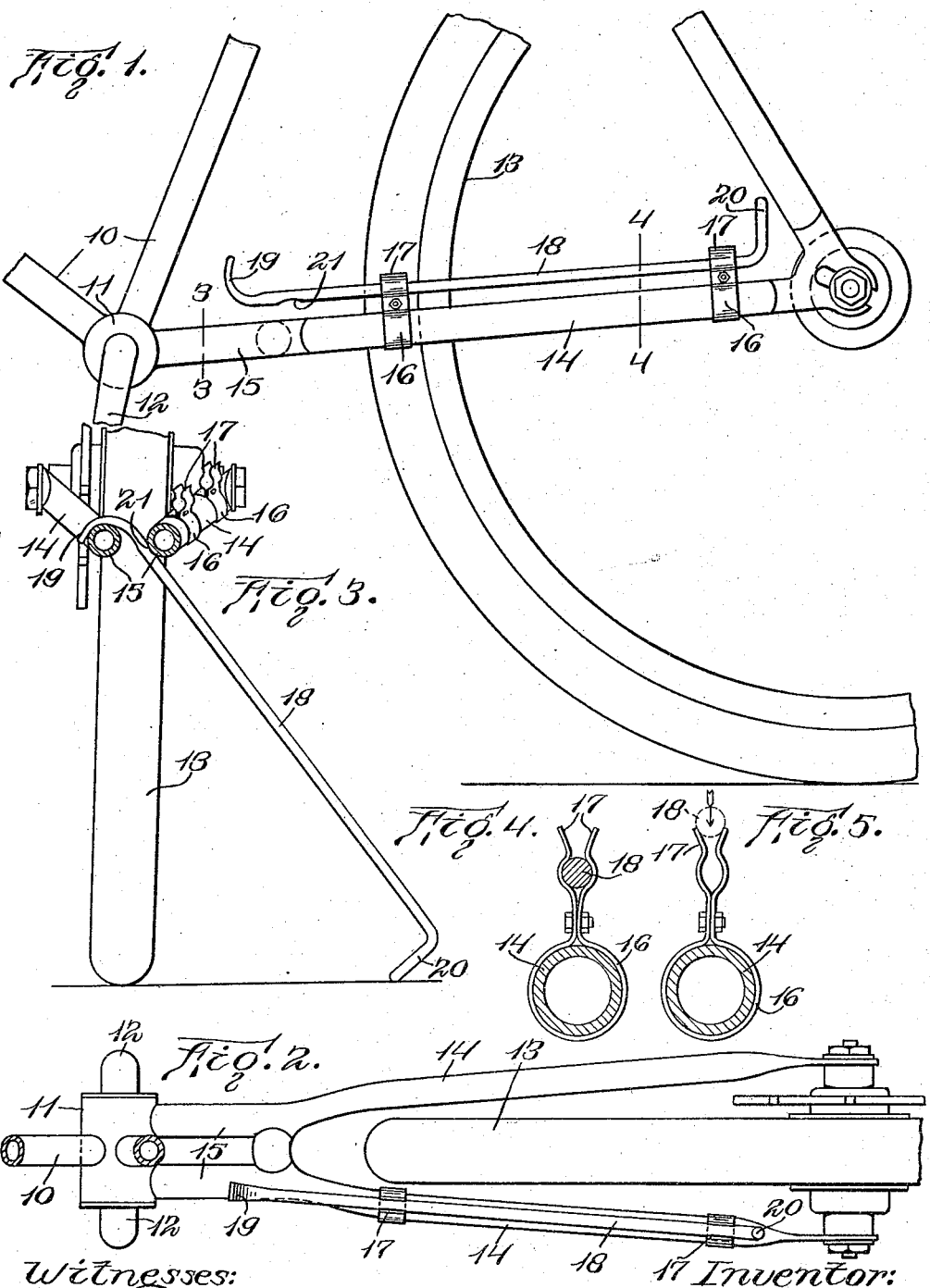

GEORGE F. COOK, OF EAST WASHINGTON, NEW HAMPSHIRE.

BICYCLE ATTACHMENT.

1,227,390.   Specification of Letters Patent.   Patented May 22, 1917.

Application filed October 20, 1913, Serial No. 796,142. Renewed January 22, 1917. Serial No. 143,845.

*To all whom it may concern:*

Be it known that I, GEORGE F. COOK, a citizen of the United States, and a resident of East Washington, in the county of Sullivan and State of New Hampshire, have invented certain new and useful Improvements in Bicycle Attachments, of which the following is a specification.

This invention relates to means for supporting a bicycle that is not in use, to prevent it from falling over. A common procedure is to leave a bicycle leaning against a post or tree box, or with a crank or hub caught upon the street curbing. Neither method is entirely satisfactory, for reasons not necessary to explain.

The object of this invention is to provide a simple, reliable, and inexpensive device which can be attached to a portion of the bicycle in an out-of-the-way location, and carried there, but which is readily detachable from its idle position and used as a strut to support the bicycle in a substantially upright position when the user wishes to leave it standing.

To these ends the invention consists in the improvements which I shall now proceed to describe and claim.

Of the accompanying drawings:—

Figure 1 is a side elevation of sufficient of the parts of a bicycle to illustrate my improvement.

Fig. 2 is a plan view of the same.

Fig. 3 represents a section on line 3—3 of Fig. 1 looking toward the right, the strut being in use.

Fig. 4 is a detail sectional view on line 4—4 of Fig. 1, on a larger scale.

Fig. 5 is a view similar to Fig. 4, the strut being removed from the clip jaws.

Similar reference characters indicate the same parts in all the figures.

A portion of the frame of a bicycle is illustrated at 10 and the crank hub at 11, a portion of a crank 12 being indicated in Fig. 1. The rear wheel 13 is supported as usual by the rear fork bars 14, the shanks 15 of which extend rearwardly from the hub. Secured to one of the fork bars 14 by suitable screws and nuts are two clips 16 having spring jaws 17, said jaws having concave portions to grip the strut 18, and flaring tips, the structure being such as to enable the strut to be readily connected to the clips by starting it from the position indicated by dotted lines in Fig. 5 and pushing it to the position shown in Fig. 4 (see also Figs. 1 and 2). From this position the strut may be quickly pulled and used to support the bicycle in a slightly inclined position such as shown in Fig. 3. The strut is curved to form a hook 19 at one end, and at the other end is bent to form a foot 20. Preferably the hook 19 is flattened, and at a short distance from the hook the upper face of the strut is concaved to form a recess 21. By upper face, I mean the face or side opposite the direction in which the hook and foot project, said face being uppermost when the device is in use.

When the rider wishes to leave his machine standing, he simply pulls the strut away from the clip jaws, inserts the hooked end upwardly between the two fork shanks, then turns the strut so that the flat hook 19 curves over one of the fork shanks 15, thus bringing the concave recess 21 against the inner lower surface of the other shank 15, and then permits the bicycle to incline slightly to one side, as shown in Fig. 3, until the foot 20 bears on the ground.

The foot 20 being at substantially a right angle to the main length of the strut, is presented to the ground at such an angle of inclination that it will neither slide over the surface nor sink unduly thereinto. The use of the strut therefore will not disfigure a lawn or graveled surface, nor can the strut be so pushed into the ground as to permit the bicycle to fall over. Owing to the hook 19 engaging one fork shank 15 and the recess 21 engaging the other shank, the bicycle cannot slip so that the strut could have longitudinal movement relatively to the fork.

The flat bearing surface presented by the hook 19 and recess 21 so engage the surfaces of the fork shanks as to practically avoid any liability of the strut rotating or swinging on its longitudinal axis when in use.

The reason for proportioning the strut as shown and described, especially the relationship or spacing of the hook 19 and recess 21, is to enable the strut to be applied to that portion of the bicycle near the crank hub which will best take and retain the supporting end thrust of the strut without liability of the machine swinging around and falling. A strut against the hub of the rear wheel or against the rear portion of the fork, would be liable to permit the machine to swing and fall due to the preponderance of inclined weight forward of the strut.

I do not limit myself to the location of the attaching clips illustrated. It is obvious that they might be connected to some other bar of the machine, or they might even be swung on the bar 14 so that the jaws would open downwardly, providing the jaws are made strong enough to keep the strut from dropping out when the machine is being ridden.

I claim:—

1. A bicycle-supporting strut comprising a bar having a transverse recess near its upper end to receive the under portion of one of the rigid arms of the rear fork of a bicycle, the contiguous extremity of said bar being curved in a direction away from said recess to pass over and removably engage the upper portion of the other arm of said fork.

2. A bicycle-supporting strut comprising a bar having a transverse recess near its upper end to receive the under portion of one of the rigid arms of the rear fork of a bicycle, the contiguous extremity of said bar being curved in a direction away from said recess to pass over and removably engage the upper portion of the other arm of said fork, the other end of said bar being bent at an angle to form a foot.

3. A bicycle-supporting strut comprising a bar having a transverse recess near its upper end to receive the under portion of one of the rigid arms of the rear fork of a bicycle, the contiguous extremity of said bar being curved in a direction away from said recess to pass over and removably engage the upper portion of the other arm of said fork, the other end of said bar being bent at an angle to form a foot, said foot and said curved end being offset from the body of said bar in the same direction.

In testimony whereof I have affixed my signature, in presence of two witnesses.

GEORGE F. COOK.

Witnesses:
G. WILL CARR,
FRANK S. CUTTING.